(12) United States Patent
Heuberger et al.

(10) Patent No.: US 10,308,226 B2
(45) Date of Patent: Jun. 4, 2019

(54) WIPER MOTOR FOR THE CLEANING OF VEHICLE WINDOWS AND WINDSCREEN WIPER SYSTEM

(71) Applicant: Valeo Wischersysteme GmbH, Bietigheim-Bissingen (DE)

(72) Inventors: Christof Heuberger, Bietigheim-Bissingen (DE); Siegfried Stefani, Bietigheim-Bissingen (DE); Markus Stubbe, Bietigheim-Bissingen (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/580,394

(22) PCT Filed: May 30, 2016

(86) PCT No.: PCT/EP2016/062177
§ 371 (c)(1),
(2) Date: Dec. 7, 2017

(87) PCT Pub. No.: WO2016/198276
PCT Pub. Date: Dec. 15, 2016

(65) Prior Publication Data
US 2018/0162324 A1 Jun. 14, 2018

(30) Foreign Application Priority Data
Jun. 11, 2015 (DE) .................. 10 2015 109 341

(51) Int. Cl.
*B60S 1/16* (2006.01)
*B60S 1/24* (2006.01)
*F16H 1/16* (2006.01)

(52) U.S. Cl.
CPC ............... *B60S 1/166* (2013.01); *B60S 1/245* (2013.01); *F16H 1/16* (2013.01)

(58) Field of Classification Search
CPC ......... B60S 1/0425; B60S 1/166; B60S 1/245
(Continued)

(56) References Cited

U.S. PATENT DOCUMENTS

| | | | |
|---|---|---|---|
| 7,673,366 B2 * | 3/2010 | Yagi | B60S 1/166 15/250.3 |
| 7,685,670 B2 * | 3/2010 | Yagi | B60S 1/166 15/250.3 |

(Continued)

FOREIGN PATENT DOCUMENTS

| | | |
|---|---|---|
| DE | 34 05 299 A1 | 8/1985 |
| DE | 195 41 913 A1 | 5/1997 |
| EP | 0 686 537 A1 | 12/1995 |

OTHER PUBLICATIONS

International Search Report of the International Searching Authority issued in PCT/EP2016/062177 dated Aug. 31, 2016 (2 pages).
(Continued)

*Primary Examiner* — Michael D Jennings
(74) *Attorney, Agent, or Firm* — Osha Liang LLP

(57) ABSTRACT

The invention relates to a wiper motor (10) for the cleaning of vehicle windows, with an output element (17) rotatable about an axis (19), wherein in the output element (17) at a distance (a) the first axis (19) a bearing mount (25) is constructed for a drive lever (30) for driving a wiper shaft (11), wherein the wiper shaft (11) is pivotably mounted in a further axis (16) arranged at least substantially parallel to the axis (19) of the output element (17), and wherein the drive lever (30) is received with an extension (35) in a clamping manner in the bearing mount (25) and extends at least substantially in a plane arranged perpendicularly to the axes (16, 19). According to the invention, it is provided that the
(Continued)

Figure 1:
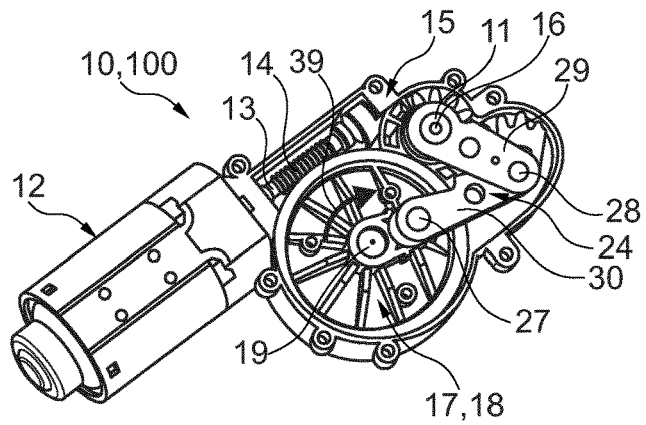

extension (35) has a fastening region (36) in the shape of a spherical segment, which cooperates with the bearing mount (25), and that the extension (35) is pivot able about a center point of the fastening region (36).

9 Claims, 1 Drawing Sheet

(58) Field of Classification Search
USPC .................................................... 15/250.27
See application file for complete search history.

(56) References Cited

U.S. PATENT DOCUMENTS

| | | | |
|---|---|---|---|
| 2008/0282491 A1* | 11/2008 | Matsumoto | B60S 1/166 15/250.13 |
| 2010/0011892 A1 | 1/2010 | Lassalle | |

OTHER PUBLICATIONS

Written Opinion of the International Searching Authority issued in PCT/EP2016/062177 dated Aug. 31, 2016 (4 pages).

\* cited by examiner

WIPER MOTOR FOR THE CLEANING OF VEHICLE WINDOWS AND WINDSCREEN WIPER SYSTEM

PRIOR ART

The invention relates to a wiper motor for the cleaning of vehicle windows according to the preamble of claim 1. The invention further relates to a windscreen wiper system for a rear window of a motor vehicle using a wiper motor according to the invention.

A wiper motor according to the preamble of claim 1 is already known from practice. Said wiper motor serves as a component of a windscreen wiper system for rear windows and permits a wiper shaft, which is arranged in the region of a gear housing and which is connected to a windscreen wiper, to move in a reciprocal manner, wherein the wiper motor at the same time performs a continuous rotational movement in a (rotational) direction. This is permitted by means of a lever mechanism consisting of two levers, wherein the one lever coupled to a gear wheel in the region of a bearing mount of the gear wheel has a pin-shaped extension, i.e. comprising a cylindrical cross section, which is arranged in the bearing mount which also has a cylindrical cross section, forming a clamped connection. It is essential to the invention that the axis of the bearing mount and/or the extension is arranged parallel to the axis of the wiper shaft, wherein the two axes, as explained above, are coupled together via the lever mechanism.

In order to achieve an operation of the wiper motor with as few losses as possible, it is essential that no transverse forces are transmitted to the bearing mount via the aforementioned lever mechanism relative to the two aforementioned axes. In practice, this is only possible by a correspondingly accurate manufacture and sufficiently rigid design of the components. In particular, even small deformations on the levers lead to corresponding transverse forces in the bearing mount and thus to an increased power consumption of the wiper motor.

DISCLOSURE OF THE INVENTION

Proceeding from the prior art set forth above, the object of the invention is to develop a wiper motor for the cleaning of vehicle windows according to the preamble of claim 1, such that the efficiency of the wiper motor itself is relatively high even with the occurrence of transverse forces in the bearing mount. In particular, the wiper motor is also intended to permit a high level of efficiency even with the possible occurrence of manufacturing tolerances and, for example, to permit the use of levers having a relatively small cross section.

This object is achieved according to the invention in a wiper motor for the cleaning of vehicle windows having the characterizing features of claim 1, in that the extension of the lever which protrudes into the bearing mount of the output element has a fastening region which is in the shape of a spherical segment and which cooperates with the bearing mount, wherein the extension is pivotable about a centre point of the fastening region inside the bearing mount.

In other words, this means that with the occurrence of forces running transversely to the axis of the bearing mount a pivoting of the extension in the bearing mount is permitted by the fastening region on the extension, said fastening region being configured to be in the shape of a spherical segment, and the pivotability thereof in the bearing mount. The pivoting of the extension relative to an extension which is not arranged in a pivotable and/or rigid manner results in a reduction in the power requirement of the drive motor and thus in an improvement of the efficiency. As a result, it is possible that the manufacturing tolerances of the levers are enlarged and/or increased, for example, and/or that the increased manufacturing tolerances do not impair the efficiency of the drive motor. Moreover, deformations which occur during or after the mounting of the lever may be compensated more effectively by the pivotable mounting of the extension and/or may lead only to a relatively slight increase in the power consumption of the wiper motor.

Advantageous developments of the wiper motor according to the invention for the cleaning of vehicle windows are disclosed in the subclaims. All combinations of at least two features disclosed in the claims, the description and/or the figures fall within the scope of the invention.

On the one hand, in order to be able to form the clamped connection between the extension and the bearing mount in the gear wheel in a simple manner and, on the other hand, in order to permit a reduction in noise during operation of the wiper motor, it is proposed that at least the extension and the output element in the region of the bearing mount consist of materials of different hardness. As a result, for example, the clamped connection may be produced in a particularly simple manner if the output element consists of a gearwheel consisting of plastic and the extension consists of metal, in particular of steel. In particular, as a result, a relatively easy deformation and/or widening of the cross section of the bearing mount in the output element is achieved when axially inserting the extension into the bearing mount. Moreover, when using plastic for the bearing mount the advantage is achieved that, in the region of the fastening region which is configured to be in the shape of a spherical segment, the extension may be manufactured with a relatively high level of tolerances since the mounting forces and/or insertion forces required during mounting are relatively low due to the use of plastic for the bearing mount, even with a relatively large difference in diameter between the fastening region of the extension and the cross section of the bearing mount.

On the one hand, in order to design the manufacture of the bearing mount in the simplest possible manner and, on the other hand, in order to keep the required insertion forces of the extension constant when axially inserted in the bearing mount, it is also advantageous if the bearing mount is constructed cylindrically.

In a structurally preferred embodiment of the wiper motor, it is provided that the drive lever provided for driving the wiper shaft in an axis which is arranged parallel to the axis of the wiper shaft and the bearing mount is pivotably mounted in a lever connected in a torque-proof manner with the wiper shaft.

The invention further comprises a windscreen wiper system for a rear window of a motor vehicle with a wiper motor according to the invention as disclosed above. In this case, the windscreen wiper system has the same advantages which are set forth within the description of the wiper motor according to the invention.

Figure 2:
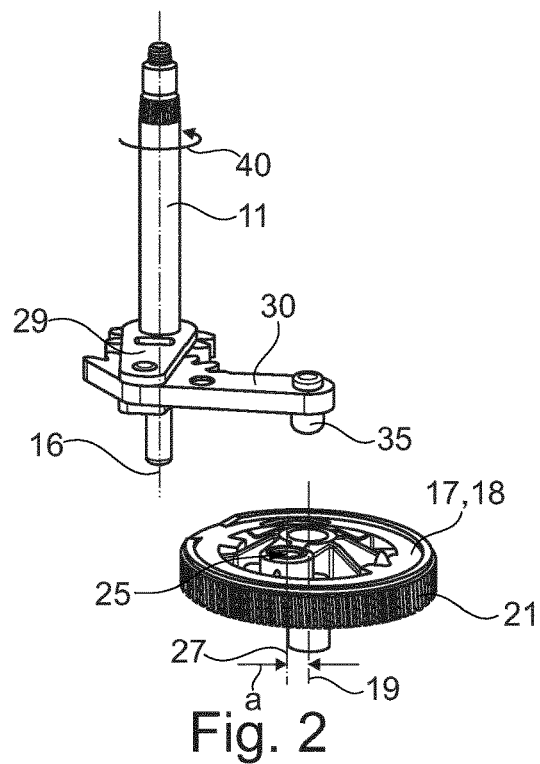
Figure 3:
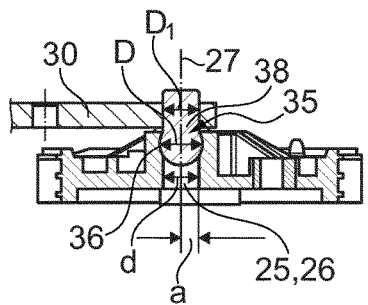

Further advantages, features and details of the invention are disclosed from the following description of preferred exemplary embodiments and with reference to the drawings, in which:

FIG. 1 shows a partial sectional view of a wiper motor for a windscreen wiper system of a rear window of a motor vehicle in a perspective view, FIG. 2 shows the components of the wiper motor essential to the invention according to FIG. 1 in a perspective individual view, in the state where they are not yet joined together, and FIG. 3 shows a longitudinal section through the region of an output element of the wiper motor when the drive lever is mounted on the output element.

The same elements and/or elements having the same function are provided in the figures with the same reference numerals.

The wiper motor 10 shown in FIG. 1 is a component of a windscreen wiper system 100 for a rear window of a motor vehicle. In particular, the wiper motor 10 serves for the reciprocal motion of a wiper blade which is not shown in the figures and which is connected via a wiper arm to a wiper shaft 11 which is visible in FIG. 2, wherein the wiper shaft 11 is rotatable in an axis 16.

The wiper motor 10 has an electric motor 12, the drive shaft 13 thereof protruding with a toothed region 14 into a gear housing 15 which is configured, in particular, in multiple parts. Inside the gear housing 15, an output element 17 which consists of plastic and which is in the form of a gear wheel 18 is rotatably mounted in a first axis 19. A toothed portion 21 configured on the outer circumference of the gear wheel 18 meshes with the toothed region 14 of the drive shaft 13 of the electric motor 12. At a distance a from the first axis 19, a bearing mount 25 is configured in the gear wheel 18. The bearing mount 25 is formed by a bore 26 which is cylindrical in cross section and which has a second axis 27 which is arranged parallel to the first axis 19. The axes 16, 19 and 27 are all arranged parallel to one another.

The drive shaft 13 is connected to the output element 17 in the region of the bearing mount 25 by two levers 29, 30 which are together connected together in a further axis 28 and which form a lever mechanism 24. The two levers 29, 30 which are arranged parallel to one another are preferably configured as parts which have been stamped from a metal plate and which have a planar cross section. The lever 30 which is arranged so as to be operatively connected to the bearing mount 25, the plane of said lever extending perpendicular to the axes 16, 19 and 27, has an extension 35 connected to the lever 30 on the side facing the bearing mount 25, said extension being configured to be substantially pin-shaped.

On the side remote from the lever 30 the extension 35 has a fastening region 36 which is configured in the shape of a spherical segment, the (external) diameter D thereof being slightly larger than the (internal) diameter d of the bearing mount 25. The lever 30 and/or the extension 35 is pivotably mounted about the centre point of the fastening region 36, which is ensured, in particular, by the intermediate portion 38 of the extension 35 arranged between the fastening region 36 and the lever 30 in the region of the bearing mount 35 having an (external) diameter $D_1$ which is (considerably) smaller than the diameter D of the bearing mount 25. The lever 29 which is connected to the wiper shaft 11 is connected in a torque-proof manner with the wiper shaft 11.

During the rotation of the drive shaft 13 of the electric motor 12 in one direction, the gear wheel 18 is rotated clockwise, for example, in the direction of the arrow 39. By the arrangement of the bearing mount 25 at the distance a from the first axis 19 and the disclosed connection of the wiper shaft 11 via the two levers 29, 30 to the bearing mount 25 and/or the gear wheel 18, in this case a reciprocal motion of the wiper shaft 11 and thus also of the wiper blade (not shown) connected to the wiper shaft 11 is achieved in the direction of the double arrow 40.

The wiper motor 10 described above and/or the windscreen wiper system 100 may be altered and/or modified in any manner without deviating from the invention.

LIST OF REFERENCE NUMERALS

10 Wiper motor
11 Wiper shaft
12 Electric motor
13 Drive shaft
14 Toothed region
15 Gear housing
16 Axis
17 Output element
18 Gear wheel
19 Axis
21 Toothed portion
24 Lever mechanism
25 Bearing mount
26 Cylindrical bore
27 Axis
28 Axis
29 Lever
30 Lever
35 Extension
36 Fastening region
38 Intermediate portion
39 Arrow
40 Double arrow
a Distance
d Diameter
D Diameter
$D_1$ Diameter
100 Windscreen wiper system

The invention claimed is:

1. A wiper motor for the cleaning of vehicle windows, comprising:
   an output element rotatable about an axis,
   wherein in the output element, at a distance from the axis, a bearing mount is constructed for a drive lever for driving a wiper shaft,
   wherein the wiper shaft is pivotably mounted in a further axis arranged at least substantially parallel to the axis of the output element,
   wherein the drive lever is received with an extension in a clamping manner in the bearing mount and extends at least substantially in a plane arranged perpendicularly to the axes, and
   wherein the extension has a fastening region in the shape of a spherical segment, which cooperates with the bearing mount, and the extension is pivotable about a center point of the fastening region.

2. The wiper motor according to claim 1, wherein at least the extension and the output element in the region of the bearing mount consist of materials of different hardness.

3. The wiper motor according to claim 2, wherein the output element is a gear wheel consisting of plastic and that the extension consists of steel.

4. The wiper motor according to claim 1, wherein the bearing mount is constructed cylindrically.

5. The wiper motor according to claim 1, wherein the drive lever in an additional axis, which is arranged parallel to the further axis, is pivotably mounted in a lever connected in a torque-proof manner with the wiper shaft.

6. A windscreen wiper system for a rear window of a motor vehicle with a wiper motor according to claim 1.

7. The wiper motor according to claim 1, wherein the fastening region of the bearing mount is such that an external diameter of the bearing mount is smaller than an internal diameter of the bearing mount, and wherein the extension has a corresponding shape.

8. The wiper motor according to claim 1, wherein the motor rotates forward.

9. The wiper motor according to claim 1, wherein the output element is round.

* * * * *